US009218160B2

(12) United States Patent
Pruneri et al.

(10) Patent No.: US 9,218,160 B2
(45) Date of Patent: Dec. 22, 2015

(54) ULTRAFAST QUANTUM RANDOM NUMBER GENERATION PROCESS AND SYSTEM THEREFORE

(75) Inventors: Valerio Pruneri, Barcelona (ES); Mitchel Morgan, Barcelona (ES); Marc Jofre Cruanyes, Barcelona (ES); Marcos Curty Alonso, Pontevedra (ES)

(73) Assignees: Fundacio Institut de Ciencies Fotoniques, Castelldefels-Barcelona (ES); Institucio Catalana de Recerca I Estudis Avancats, Barcelona (ES); Universidade de Vigo, Pontevedra (ES)

( * ) Notice: Subject to any disclaimer, the term of this patent is extended or adjusted under 35 U.S.C. 154(b) by 291 days.

(21) Appl. No.: 13/566,500

(22) Filed: Aug. 3, 2012

(65) Prior Publication Data
US 2013/0036145 A1 Feb. 7, 2013

(30) Foreign Application Priority Data
Aug. 4, 2011 (ES) .................................. 201131362

(51) Int. Cl.
*G06F 7/58* (2006.01)
(52) U.S. Cl.
CPC ..................... *G06F 7/588* (2013.01)

(58) Field of Classification Search
None
See application file for complete search history.

(56) References Cited

U.S. PATENT DOCUMENTS 7,403,623 B2 * 7/2008 Cerf et al. ..................... 380/278

OTHER PUBLICATIONS

Spanish State of the Art Report, issued Aug. 8, 2011.
Guo, Hong, "Truly Random Number Generation Based on Measurement of Phase Noise of Laser", http://arxiv.org/pdf/0908.2893.pdf, Jan. 20, 2010.
Qi, Bing, "High-speed quantum random number generation by measurement phse noise of a single-mode laser", Optics Letters vol. 35, No. 3, Feb. 2010, pp. 312-314.

* cited by examiner

*Primary Examiner* — Michael D Yaary
(74) *Attorney, Agent, or Firm* — Vedder Price P.C.

(57) ABSTRACT

The invention is based on a process and system for producing random numbers by means of a quantum random number generator where the method comprises the steps of operating a laser in single mode and high modulation bandwidth by means of an electrical pulse driver, transforming the phase randomized optical pulses produced before in optical pulses with random amplitude and detecting the resulting random amplitude signals by means of a fast photodiode. The numbers thus produced are truly random.

20 Claims, 2 Drawing Sheets

ULTRAFAST QUANTUM RANDOM NUMBER GENERATION PROCESS AND SYSTEM THEREFORE

This application claims priority of Spanish Patent Application No. P 201131362, filed Aug. 4, 2011, the entire contents of which are hereby incorporated by reference into this application.

FIELD OF THE INVENTION

The present invention relates to random number generators (RNGs), in particular to generators based on the intrinsic randomness of quantum observables.

BACKGROUND OF INVENTION

Random numbers form sequences of numbers or symbols that lack any pattern and appear random. A random number generator (RNG) is a computational or physical device designed to generate random numbers. RNGs can be classified in pseudo-RNGs (PRNGs), computational algorithms, and true-RNGs (TRNGs). TRNGs are physical devices designed to generate sequences of numbers or symbols that lack any pattern. Moreover, RNGs implemented with physical devices can be subdivided into classical RNGs (CRNGs), based on classical hardware devices with unpredictable behaviour, and quantum RNGs (QRNGs) based on quantum effects [1, 2, 3].

Current commercial RNG devices are based on: quantum single photon detector arrays [4], CMOS metastability, noise signal by using the stochastic physical phenomenon of electrons trapped in the silicon nitride layer of a transistor, arrival detection time of photons of a continuous wave (cw) operated laser, reversed bias semiconductor junction, thermal or Johnson noise and transistor noise. Several documents describe those devices: a light beam illuminating a quantum detector array [5], wave diffraction using a high-order grating [6], photon detection as random events [7], photon coupling to a single-mode coupler [8], electrical noise [9, 10], single photon laser beam splitting using homodyne detection [11].

The publication "High-speed quantum random number generation by measuring phase noise of a single-mode laser" by Bing Qi et. al. [12] discloses a QRNG based on measuring the quantum phase noise of a single-mode semiconductor laser. The phase noise of the laser originates from amplified spontaneous emission (ASE) when the laser is operated very close to its threshold. The system has a 500 Mbit/s random number generation rate, limited by the capability of the system to enlarge the ASE bandwidth to reduce the coherence time. A phase modulator is used to reduce the impact of periodic drifts that limits the length of the generated random sequence. However, besides being an additional element, the phase modulator is itself intrinsically subjected to drift, if electro-optics materials such as $LiNbO_3$ are used. In addition, the fact that the laser is operated very close to its threshold makes it more difficult to avoid classical noise, which reduces the level of quantum randomness associated to ASE.

There is thus a need for a higher rate QRNG source, which shortens the coherence time, avoids the use of a phase modulator and where the impact of classical noise is strongly reduced.

SUMMARY OF THE INVENTION

It is the aim of the invention to provide a QRNG which overcomes the limitations of the prior art. For this purpose, the invention comprises the steps of operating a laser diode in single mode and high modulation bandwidth by means of an electrical pulse driver, transforming the phase randomized optical pulses into optical pulses with random amplitude and detecting these resulting random amplitudes by means of a fast photodiode (PIN). The laser is first operated far below threshold and then, in the generation of the optical pulse, taken above threshold to amplify the laser cavity field to a macroscopic level. Preferably, the laser is a laser diode and the pulse driver is operated such that the duration of the electrical pulses should be lower than 50% of the repetition period of the optical pulses. There are two possibilities for transforming the pulses: by passing them through a Mach-Zehnder interferometer or by combining them with the optical signal from another laser before detecting them. In the first case, optionally, the signals can be optically isolated so as to avoid reflected optical power into the laser cavity. A possible system for putting into practice the process according to the invention is also provided. Such a system comprises a laser diode for producing random phase optical pulses, a Mach-Zehnder interferometer provided with two polarization maintaining couplers, a polarization maintaining fiber, an electrical pulse driver for the laser diode and a fast photodiode for detecting the output signals of the interferometer. An optical isolator between the laser diode and the interferometer adapted to avoid back reflected optical power into the cavity can also be provided.

BRIEF DESCRIPTION OF THE DRAWINGS

To complete the description for a better understanding of the invention a set of drawings is provided. Said drawings illustrate preferred embodiments of the invention, which should not be interpreted as restricting the scope of the invention, but just as an example of how the invention can be embodied.

DESCRIPTION OF THE INVENTION

The invention is based on the transformation of random phase laser pulses into random amplitude pulses that can be detected with a fast photodiode, and the use of an electrical pulse driver. In the first embodiment (FIG. 1), this is achieved by using a single-mode laser source emitting an optical pulse train produced with the aid of an electrical driver with a given period, then splitting the optical pulse train into two equivalent optical pulse trains, delaying one of the trains by at least one period, recombining the pulses and finally detecting the resulting output intensities. In the second embodiment (FIG. 2), instead of splitting and delaying the pulses from the laser, one can combine the latter with another laser source and then detect the output intensities.

Figure 1:
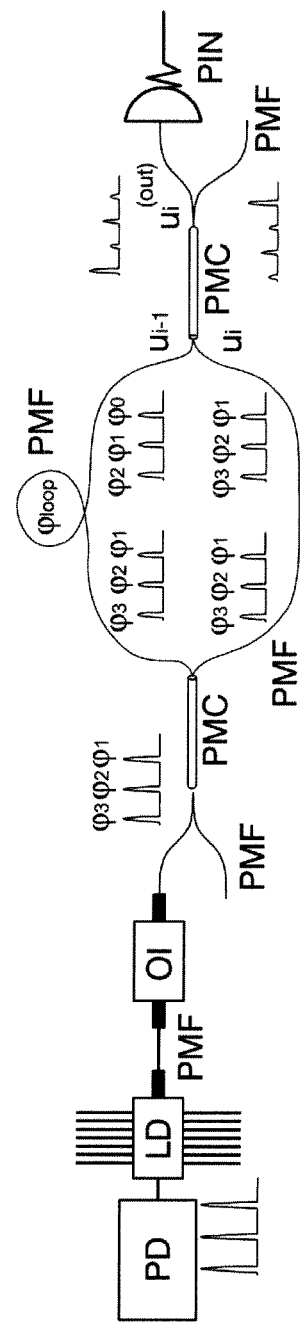
FIG. 1.—shows a first set up for putting into practice a first process according to the invention, in which a laser diode produces random phase optical pulses which pass through a Mach-Zehnder interferometer, interfering optically and then being electrically detected.
Figure 2:
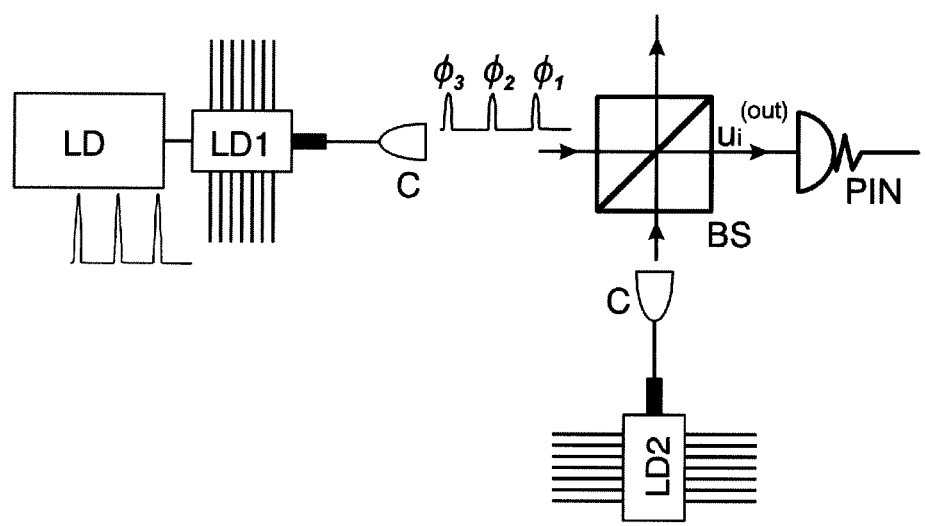
FIG. 2.—is a second set up for putting into practice a second process according to the invention, in which the phase of the random phase pulses of the first laser diode is combined with the signal of a second laser

With reference to FIG. 1, a system for putting into practice the process of the invention comprises a laser diode (LD) as the oscillator, providing single-mode operation and high modulation bandwidth. A single-mode LD is directly modulated by a train of sufficiently short electrical pulses. The duration of the electrical pulses should be lower than 50% of the repetition period of the generated pulse train. A polarization-maintaining all-fiber unbalanced Mach-Zehnder interferometer (MZI) provides a stable single-mode interferometer. The interferometer consists of an input coupler, which equally splits in power the incoming optical pulses into the two arms. The long length arm allows delaying the stream of copied pulses by one period with respect to the pulses in the short arm. In the output coupler, the two streams of pulses interfere coherently. In FIG. 1, PD denotes the electrical pulse driver to directly modulate the laser, LD the laser diode, OI an optical isolator that avoids back reflected optical power into the cavity of the LD, PMF a polarization maintaining fiber to facilitate the stability in polarization along the interferometer, $\phi_{0-3}$ are the optical phases of different consecutive pulses, PMC is a polarization maintaining coupler, $\phi_{loop}$ is the phase introduced by the long arm which corresponds to an appropriate time delay, and finally PIN is a fast photodiode. The random phase of the different input pulses translates into the output signals acquiring random amplitudes.

The laser source is first operated with a current at least 30% below the threshold value, producing simultaneously strong attenuation of the cavity field and a high ASE. This attenuates to a negligible level any prior coherence, while the ASE, itself a product of vacuum fluctuations, contributes a masking field with a true random phase. The laser is then briefly taken above threshold, to rapidly amplify the cavity field to a macroscopic level, typically to a few tens of mW of peak power. The amplification is electrically pumped and thus optical phase-independent. Due to gain saturation, the resulting field has predictable amplitude but a true random phase. The cycle is repeated, producing a stream of identical random phase optical pulses.

Interference of subsequent pulses converts the phase randomness into a strong amplitude modulation of random intensity, which is directly detected by a conventional fast photodiode and subsequently digitized.

A second embodiment (FIG. 2) includes two laser sources (LD1, LD2). Similarly to the laser source of FIG. 1, at least one of the two sources (LD1) emits phase randomized pulses driven by an electrical pulse driver. The laser beams of equal wavelength from LD1 and LD2 are then combined together, for example through the use of a beam splitter (BS). In this way the random phase of the pulses emitted by at least LD1 generates random amplitudes in the output signal. With respect to the scheme of FIG. 1, the scheme in FIG. 2 allows avoiding the use of the input coupler and time delay line, hence of the interferometric structure, thus relaxing the requirement to control the system. The power of the source (LD2), which can be operated either in pulsed or continuous wave regime, can reach higher power values, thus producing higher energy pulses at the output and allowing in this way to extract more random bits per pulse.

It is clear that for any person skilled in the art each of the above embodiments can be realized using fiber geometry (FIG. 1), free space geometry (FIG. 2), waveguide geometry, or hybrid geometry (i.e. a combination of these geometries). In the case of waveguide geometry, also known as integrated optic geometry, the optical fiber elements (splitter, delay, coupler, etc.) of FIG. 1 are replaced by optical waveguide elements. The laser sources and the photodiode can also be integrated into the same waveguide chip or through hybrid integration techniques known to any person skilled in the art.

In the following we provide a particular example of how the system of FIG. 1 can be implemented:

LD1 is a laser diode emitting at around 852 nm, is set with 25 mA direct current, far below its threshold value of 36 mA. It is electrically modulated at 100 MHz with electrical pulses of about 1 ns duration. Phase randomized coherent optical pulses of 400 pa time width and 3.5 mW peak power are produced. A 30 dB optical isolator (OI) is placed just after the laser diode LD1 to avoid back reflections into the oscillator cavity of the laser diode LD1. Then, the linearly polarized optical pulses are split in power using a polarization maintaining coupler (PMC) with a fixed coupling ratio. In one of the output ports of the PMC, a 2 m polarization maintaining fiber (PMF) patchcord is connected, which corresponds approximately to the equivalent length of the pulse repetition period of about 10 ns between successive pulses. Finally, both arms of the interferometer are connected to a second PMC where the interference between pulses takes place. The overall interferometer setup, measured at the output, has power coupling ratios of 49.8% and 40.3%, and polarization isolation of 23.98 dB and 25.23 dB, for the two arms. At one of the output ports of the interferometer, a 150 MHz photodiode is connected for detecting the different interfering optical pulses produced at the output which are processed by a fast oscilloscope. The oscilloscope is operated with a 200 MHz bandwidth for the input channel, triggered by the system clock reference.

The time delay difference of the interferometer is adjusted by matching the pulse repetition frequency (PRF) at 97.6 MHz.

The parameter $\Phi_{loop}$ is controlled by implementing a reduced range tuning by fine tuning the propagation properties of the long arm of the interferometer. For instance, by changing the temperature of the optical fiber one can produce a refractive index change and thermal expansion corresponding to an equivalent displacement of a wavelength (852 nm) for a 0.03° C. temperature change.

Otherwise, the parameter $\phi_{loop}$ can be controlled by implementing a full range tuning as explained below. The interferometer is temperature stabilized to 0.01° C. to keep the parameter $\phi_{loop}$ constant. Pulse repetition frequency detuning corresponds to a change in the period between consecutive optical pulses enabling the temporary adjustment of the overlap of the pulses in the two arms of the interferometer. A 200 KHz detuning corresponds to a change in the period of the optical pulse train of $\Delta t=20$ ps. Since the optical pulse duration is 400 ps, when $\Delta t=400$ ps the pulses do not overlap temporally anymore.

Thanks to the use of optical pulses of macroscopic intensity, many bits can be encoded per pulse (12-18 bits) with moderate signal powers (mW). The achieved random number generation rate is 1.11 Gbps. Higher generation rates up to 100 Gbps can be achieved just by increasing the LD direct modulation frequency as well as increasing the encoded number of bits per pulse. The emitting wavelength can also be chosen to improve the electro-optical performance, level of integration and reduce the cost, for example by using components known in the telecommunications sector at a wavelength around 1550 nm.

The proposed QRNGs scheme has a low complexity detection system based on standard photodiodes and conventional electronic acquisition system, enabling to achieve high random number generation rates. Furthermore, its calibration procedure can be easily automated allowing it to have a long operational lifetime. The invention can produce high rates of truly random numbers thanks to its working principle and utilizes commercially available optical and electronic components, thus offering a low cost and integrated solution.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of components, configuration, etc.), within the general scope of the invention as defined in the claims.

REFERENCES

[1] A. Uchida, K. Amano, M. Inoue, K. Hirano, S. Naito, H. Someya, I. Oowada, T. Kurashige, M. Shiki, S. Yoshimori, K. Yoshimura, and P. Davis, "Fast physical random bit generation with chaotic semiconductor lasers," *Nature Photonics*, vol. 2, pp. 728-732, 2008.
[2] H. Guo, W. Tang, Y. Liu, and W. Wei, "Truly random number generation based on measurement of phase noise of a laser," *Physical Review E*, vol. 81, p. 051137, 2010.
[3] C. Gabriel, C. Wittmann, D. Sych, R. Dong, W. Mauerer, U. L. Andersen, C. Marquardt, and G. Leuchs, "A generator for unique quantum random numbers based on vacuum states," *Nature Photonics*, vol. 4, pp. 711-715, 2010.
[4] "Random number generation using quantum physics," *ID Quantique White Paper,* 2010. [Online]. Available: http://www.idquantique.com/images/stories/PDF/quantis-random-generator/quantis-whitepaper.pdf
[5] G. Ribordy and O. Guinnard, "Method and apparatus for generating true random numbers by way of a quantum optics process," US patent 2007127718, 2007.
[6] W. Gunawan and M. Berhad, "Quantum random number generator based on diffraction of high-order grating," International patent WO 2010062161, 2010.
[7] Z. Yuan, J. Dynes, M. R. Stevenson, and A. J. Shields, "Random number generation using photon detection events," International patent GB 2457328, 2009.
[8] Y. Luo and T. C. Kern, "Quantum random number generators," International patent KR 20080025151, 2008.
[9] T. Kanai, M. Tarui, and Y. Yamada, "Random number generator," International patent WO2010090328, 2009.
[10] P. R. Tapster and P. M. Gorman, "Apparatus and Method for Generating Random Numbers," US patent 2009013019, 2009.
[11] A. Trifonov and H. Vig, "Quantum noise random number generator," U.S. Pat. No. 7,284,024, 2007.
[12] B. Qi, Y.-M. Chi, H.-K. Lo and L. Qian, "High-speed quantum random number generation by measuring phase noise of a single-mode laser," *Optics Letters*, Vol. 35, Issue 3, pp. 312-314 (2010).

The invention claimed is:

1. A process for generating random numbers by means of a quantum random number generator, the process comprising the steps of:
   a) operating a laser (LD) in single mode and high modulation bandwidth by means of an electrical pulse driver (PD) to produce phase randomized optical pulses,
   b) transforming the phase randomized optical pulses produced in a) into optical pulses with random amplitude, and
   c) detecting the resulting random amplitude signals by means of a fast photodiode (PIN),
   so as to thereby generate random numbers based solely on the random amplitude signals.
2. The process according to claim 1, wherein the laser (LD) is a laser diode.

3. The process according to claim 1, wherein the laser is firstly operated far below the threshold and then above the threshold for amplifying the field in the laser cavity to a macroscopic level.
4. The process according to claim 1, wherein the pulse driver is operated such that the duration of the electric pulses is lower than 50% of the repetition period of the optical pulses.
5. The process according to claim 1, wherein the phase randomized optical pulses produced in a) are transformed by passing them through a Mach-Zehnder interferometer (MZI) having optical fibers made of silica.
6. The process according to claim 1, wherein the phase randomized optical pulses produced in a) are transformed by combining them with the optical signal from another laser (LD2).
7. The process according to claim 1, further comprising a step of optically isolating the signals so as to avoid reflected optical power into the laser cavity.
8. The process according to claim 2, wherein the laser is firstly operated far below the threshold and then above the threshold for amplifying the field in the laser cavity to a macroscopic level.
9. The process according to claim 3, wherein the pulse driver is operated such that the duration of the electric pulses is lower than 50% of the repetition period of the optical pulses.
10. The process according to claim 3, wherein the phase randomized optical pulses produced in a) are transformed by passing them through a Mach-Zehnder interferometer (MZI) having optical fibers made of silica.
11. The process according to claim 4, wherein the phase randomized optical pulses produced in a) are transformed by passing them through a Mach-Zehnder interferometer (MZI) having optical fibers made of silica.
12. The process according to claim 3, wherein the phase randomized optical pulses produced in a) are transformed by combining them with the optical signal from another laser (LD2).
13. The process according to claim 4, wherein the phase randomized optical pulses produced in a) are transformed by combining them with the optical signal from another laser (LD2).
14. A system comprising a diode laser for producing random phase input signals, a Mach-Zehnder interferometer (MZI) provided with a polarization maintaining fibers (PMF) and polarization maintaining couplers (PMC), characterized in that it further comprises an electrical pulse driver (PD) for the laser (LD) and a fast photodiode (PIN) for detecting solely the amplitude of the output signals of the interferometer (MZI).
15. The system according to claim 14, characterized in that it further comprises an optical isolator between the laser (LD) and the interferometer (MZI) adapted to avoid back reflected optical power into the laser cavity.
16. The process according to claim 8, wherein the pulse driver is operated such that the duration of the electric pulses is lower than 50% of the repetition period of the optical pulses.
17. The process according to claim 8, wherein the phase randomized optical pulses produced in a) are transformed by passing them through a Mach-Zehnder interferometer (MZI) having optical fibers made of silica.
18. The process according to claim 16, wherein the phase randomized optical pulses produced in a) are transformed by passing them through a Mach-Zehnder interferometer (MZI) having optical fibers made of silica.

19. The process according to claim 8, wherein the phase randomized optical pulses produced in a) are transformed by combining them with the optical signal from another laser (LD2).

20. The process according to claim 16, wherein the phase randomized optical pulses produced in a) are transformed by combining them with the optical signal from another laser (LD2).

* * * * *

UNITED STATES PATENT AND TRADEMARK OFFICE
CERTIFICATE OF CORRECTION

| | | |
|---|---|---|
| PATENT NO. | : 9,218,160 B2 | Page 1 of 1 |
| APPLICATION NO. | : 13/566500 | |
| DATED | : December 22, 2015 | |
| INVENTOR(S) | : Pruneri et al. | |

It is certified that error appears in the above-identified patent and that said Letters Patent is hereby corrected as shown below:

Item 75, the correct Inventors for this application should be listed as follows:

Valerio PRUNERI, Barcelona, SPAIN;
Morgan Mitchell, Barcelona, SPAIN;
--Marc Jofre Cruanyes, Barcelona, SPAIN;--
Marcos Curty Alonso, Vigo, SPAIN Signed and Sealed this
Second Day of August, 2016

Michelle K. Lee
*Director of the United States Patent and Trademark Office*